United States Patent [19]

Endoh

[11] Patent Number: 5,382,968
[45] Date of Patent: Jan. 17, 1995

[54] RASTER IMAGE SERIAL PRINTER HAVING VARIABLE BUFFER MEMORY AND METHOD FOR OPERATING SAME

[75] Inventor: Masakatsu Endoh, Nagano, Japan

[73] Assignee: Seiko Epson Corporation, Tokyo, Japan

[21] Appl. No.: 98

[22] Filed: Jan. 4, 1993

[30] Foreign Application Priority Data

Jan. 7, 1992 [JP] Japan ............................ 4-018517
Nov. 2, 1992 [JP] Japan ............................ 4-317913

[51] Int. Cl.6 .................................................. G01D 15/06
[52] U.S. Cl. ................................... 346/153.1; 358/431; 395/114
[58] Field of Search ................. 346/1.1, 160, 153.1, 346/154; 358/431, 430; 395/108, 109, 110, 111, 112, 113, 114, 115, 116, 117, 118

[56] References Cited

U.S. PATENT DOCUMENTS

| | | | |
|---|---|---|---|
| 4,549,221 | 10/1985 | Yamamoto et al. | 358/431 |
| 4,586,088 | 4/1986 | Kondo | 358/257 |
| 4,661,857 | 4/1987 | Kondo | 358/431 |
| 4,949,105 | 8/1990 | Prowak | 346/154 |
| 4,970,661 | 11/1990 | Tsuzuki et al. | 346/154 X |
| 5,068,805 | 11/1991 | Tsuzuki | 395/165 |

Primary Examiner—Benjamin R. Fuller
Assistant Examiner—Randy W. Gibson
Attorney, Agent, or Firm—Sughrue, Mion, Zinn, Macpeak & Seas

[57] ABSTRACT

A raster image serial printer in which a printing operation can be carried out using a buffer having as small a capacity as possible by altering the form of bit map data in proportion to the amount of the memory that can be used as an image buffer. The inventive raster image serial printer includes a print data decision unit for determining the type of input data, a buffer capacity decision unit for determining the capacity of a buffer in which raster image data is assembled, an image assembling unit for assembling the image by determining the number of bits to be assembled corresponding to the available memory capacity, and a latch for latching the image data assembled in the buffer and null data for making up the deficiency. When the input data is raster image data and the capacity of an image buffer is small, the printing operation is carried out while the deficiency is made up by null data in such a way that bit map data lines fewer in number than the dot forming elements of a recording head are stored in the buffer.

8 Claims, 10 Drawing Sheets

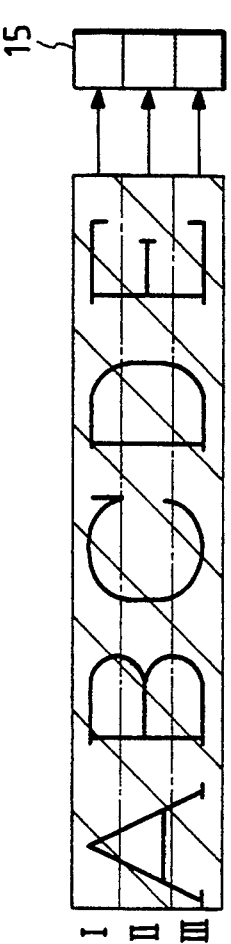
FIG. 7(iii)

RASTER IMAGE SERIAL PRINTER HAVING VARIABLE BUFFER MEMORY AND METHOD FOR OPERATING SAME

BACKGROUND OF THE INVENTION

The present invention relates to a raster image serial printer for producing printed data by carrying out raster scanning with a serial recording head in response to bit map data received from a host computer.

A printing operation in a raster image mode is started when bit map data is store in a print buffer. Conventionally, when a printhead with 24 dot forming elements arranged in the subscanning direction (i.e., in the paper feeding direction) is used, for instance, printing cannot be started until data has been assembled and stored corresponding to all 24 dots in the subscanning direction and the number of print columns, i.e., a number of dots in the subscanning direction determined by the desired printing resolution. For this purpose, there has been provided a print image buffer having a capacity equal to the product of the number of print columns and the number of dot forming elements of the recording head.

The storage capacity of the print image buffer must be increased as the numbers of print columns and dot forming elements are increased. Therefore, to be able to print all types of data, it is necessary to either provide an image buffer having a large storage capacity or allow the printer to wait a relatively long period of time while the necessary data is assembled and stored in the print image buffer.

SUMMARY OF THE INVENTION

In view of the foregoing problems, it is an object of the invention to provide a serial printer having a novel raster imaging function capable of varying the memory capacity of a print image buffer required to be filled before a printing operation can be started so that the printing operation can be started in a short amount of time without having to store bit map data in the subscanning direction in conformity with the number of dot forming elements of the recording head. It is a further object of the invention to provide a method for operating such a printer.

In accordance with the above and other objects, a serial printer according to the present invention is provided with a print data decision means for determining the type of input data, a buffer capacity decision means for determining the capacity of a buffer in which image data is stored, an image assembly means for assembling the image data in the buffer by determining the number of bits to be stored in the columnar direction corresponding to the result obtained by the decision means, and a null data generating means for assembling the print data in the buffer together with non-printing null data.

When the input data requires a printing operation in a raster image mode but the memory capacity of the print image buffer is not large enough to store the entire image data, the printing operation is started in a state where bit map data in a number of lines fewer than the number of dot forming elements of the recording head has been stored in the print image buffer, while null data is used to make up the deficiency. It thus becomes possible to reduce the capacity of the buffer for assembling and storing the print image data and to shorten the time required to store the data in the buffer.

DESCRIPTION OF THE PREFERRED EMBODIMENTS

Referring to the accompanying drawings, a detailed description will subsequently be given of preferred embodiments of the present invention.

Figure 2:
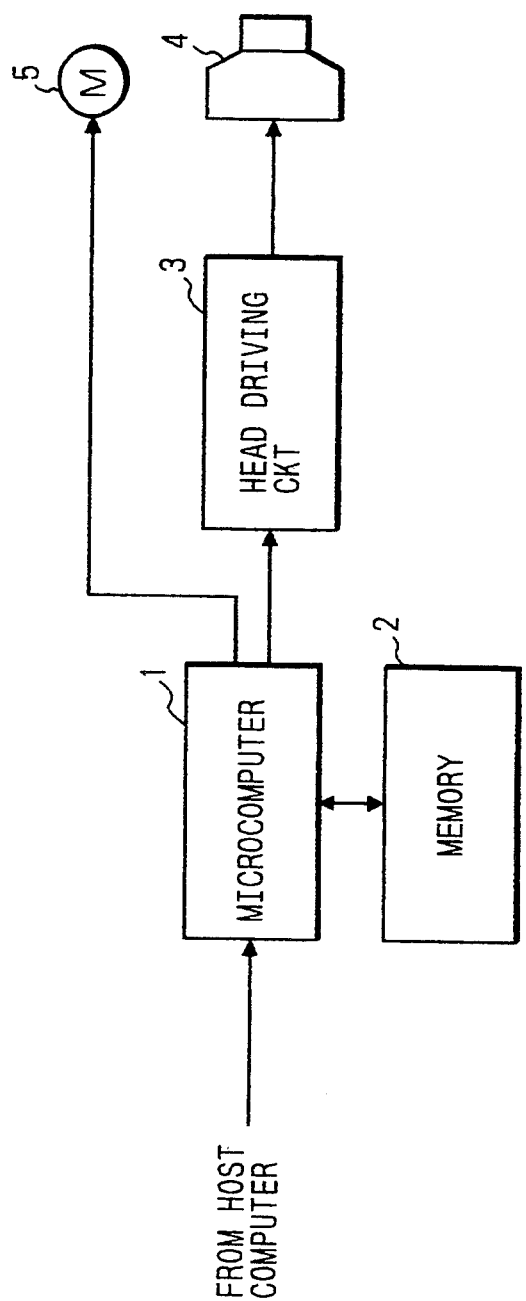
FIG. 2 is a block diagram of a raster image serial printer embodying the present invention.
Figure 3:
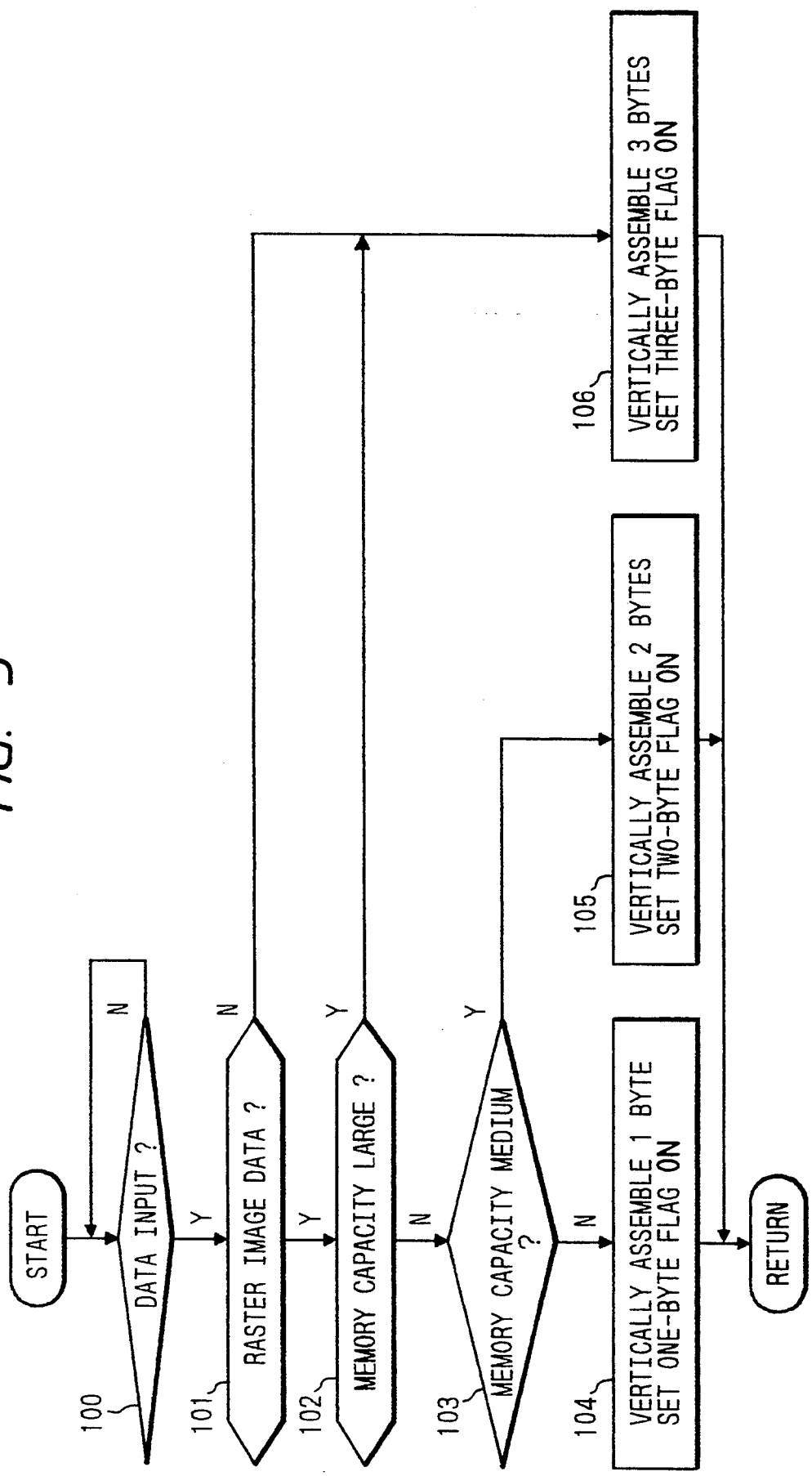
FIG. 3 is a flowchart showing an operation for determining a data storage mode in the printer of FIG. 2.

FIG. 2 illustrates a preferred embodiment of a raster image serial printer of the present invention, wherein reference numeral 1 denotes a microcomputer for generating image data of a size corresponding to the capacity of a print image buffer when a printing operation is to be carried out in a raster image mode in accordance with print data received from a host computer, for converting code data to bit map data by means of a character generator (not shown), and for controlling a paper feed motor in such a manner as to feed paper through a length corresponding to a print span in the subscanning direction. The microcomputer is provided with a memory 2 for forming both work areas and a print image buffer. Reference numeral 3 denotes a recording head driving circuit for operating dot forming elements $P_1$–$P_{24}$ (FIG. 8) such as wire dots, heating elements, ink jets, or the like of a serial recording head in response to the bit map data received from the microcomputer 1.

Figure 1:
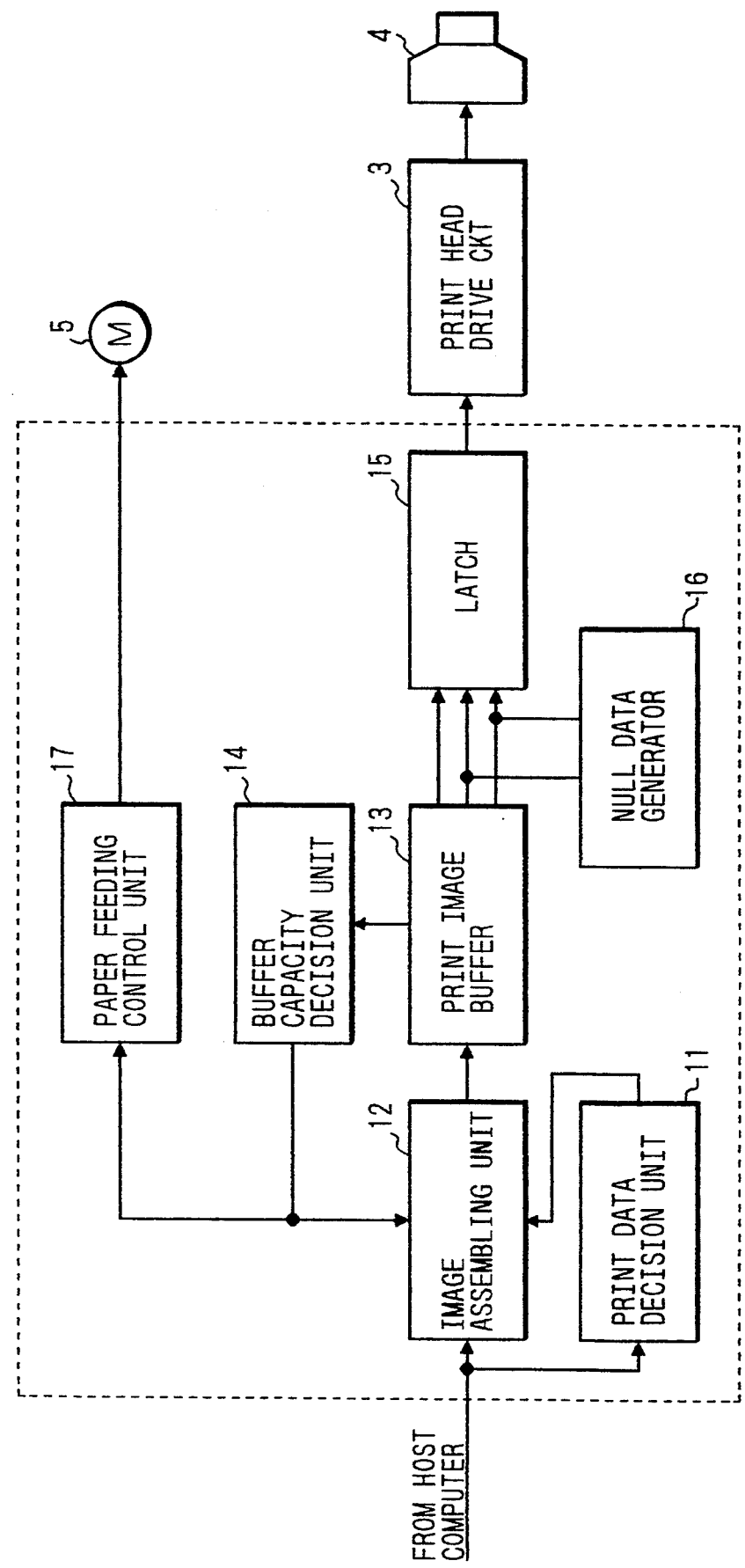
FIG. 1 is a block diagram of functional parts of a microcomputer system implementing the invention.

FIG. 1 is a block diagram illustrating functions to be performed by the microcomputer. The microcomputers programmed to a print data decision unit 11 for determining whether or not the print data received from a host computer is raster image data, an image assembling unit 12 for assembling, in a print image buffer 13, image data of a type in agreement with the type of print data and the capacity of the memory, a buffer capacity decision unit 14 for determining the available capacity of the image buffer in the memory, a latch 15 for latching image data conforming to the number of lines of data assembled in the image buffer 13, that is, the number of bits in the subscanning direction and for latching null data for making up any deficiency, and a paper feed unit 16 for feeding paper through a distance corresponding to the length in the subscanning direction of the image data that has been printed.

Figure 8:
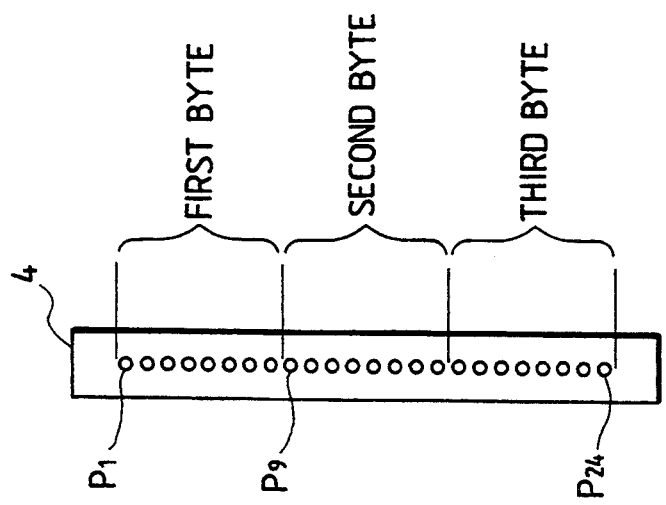
FIG. 8 is an elevational view of a recording head used in the practice of the present invention.

Referring to the flowcharts of FIGS. 3-6 inclusive, a description will subsequently be given of the operation of the system thus constructed considering the case of a recording head which has 24 dot forming elements in the subscanning direction, as shown in FIG. 8, and which is thus capable of simultaneously printing three bytes of data in the subscanning direction during one printing operation.

When print data is output from the host computer (Step 100, FIG. 3), the print data decision unit 11 determines whether or not the data is in the raster image mode (Step 101). If the data is determined to be in the raster image mode, assuming that the memory 2 has only a small storage capacity, the buffer capacity decision unit 14 determines that the capacity of the image buffer 13 is small in relation to the data (Steps 102, 103). Accordingly, the assembly of eight bits of data, that is, only one byte of data in the subscanning direction, is carried out, and a one-byte flag is set in the ON state (Step 104).

On the other hand, in a case where there is still sufficient capacity format least two bytes to be assembled lengthwise in the image buffer 13 (even though the memory 2 may have minimal additional storage capacity) (Steps 102, 103), the assembly of 16 dots, that is, two bytes in the subscanning direction, is determined, and a two-byte flag is set to the ON state (Step 105).

Further, in a case where the data is not in the raster image mode (Step 101) or where the memory 2 has sufficient storage capacity (Step 102), such as when character code data is received, the assembly of at least 24 dots, that is, three bytes in the subscanning direction, is determined and a three-byte flag is set to the ON state (Step 106).

When the byte flag has thus been set, the image assembly unit 12 stores raster image data for line no. 0. The data is sequentially fed from the host computer in the raster image mode in eight-bit bytes, and stored at addresses 7, 15, 23,..., N−1 (N=multiples of eight) in the image buffer 13 in consideration of crosswise conversion at the time the data is fed to the recording head 4. Similarly, raster image data for the next line (line no. 1) are stored in succession at eight-byte intervals at addresses 6, 14, 22, ..., N−2 located just prior to the addresses at which the respective data for line no. 0 are stored (Step 110, FIG. 4). The one-byte flag is checked (Step 112) when the raster image data for line no. 7 have been stored at addresses 0, 8, ..., N−8 in the image buffer 13 after repetition of the storage operation in the above-described manner. If the byte flag is ON, the reception of the raster image data from the host computer is suspended and a crosswise conversion process is performed (Step 113).

Figure 5:
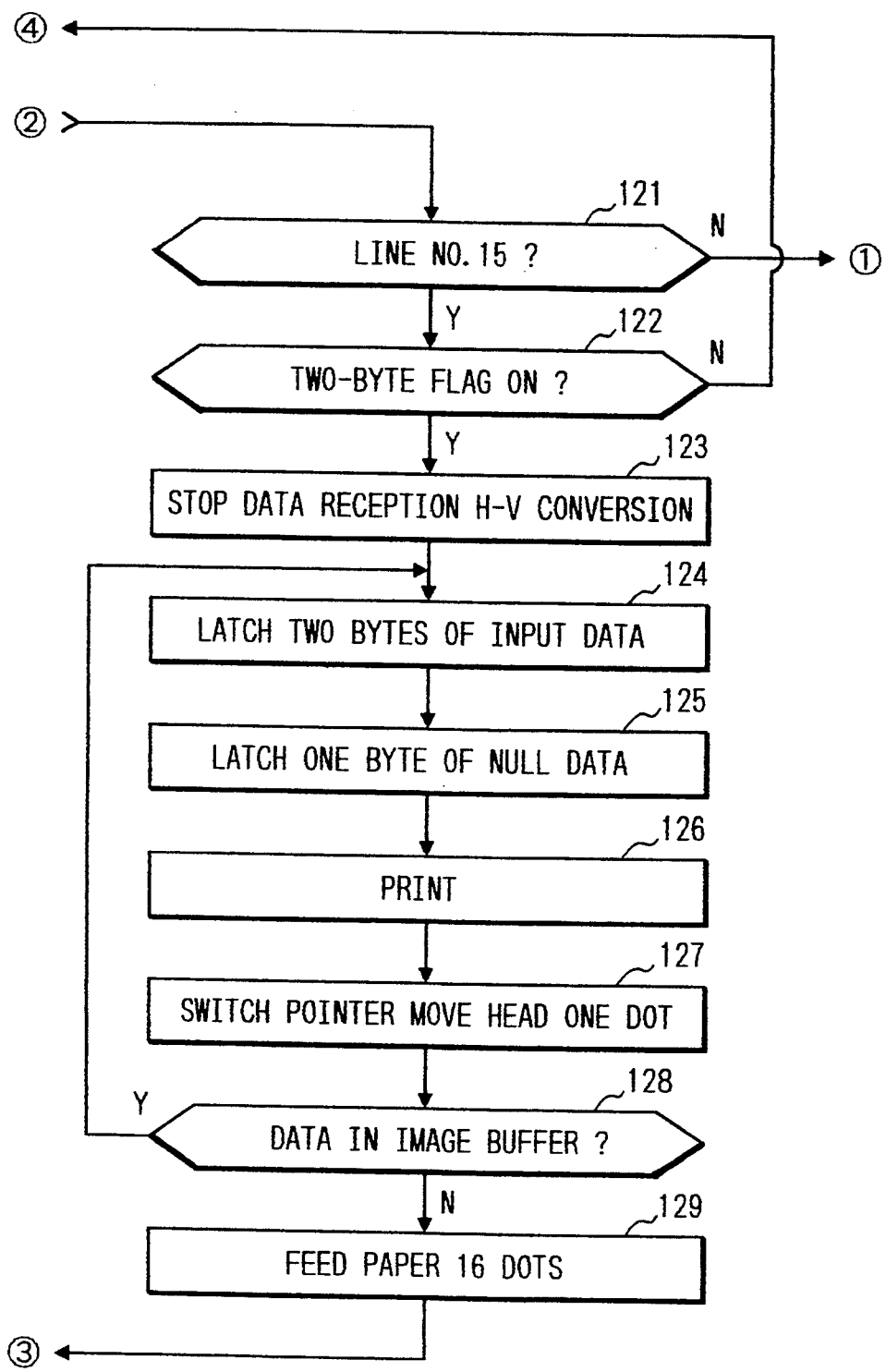
FIG. 5 is a flowchart showing the printing operation in a two-byte mode in the above printer.

If the one-byte flag is OFF, the image assembling unit 12 receives raster image data for line no. 8 in succession, and with N as an offset value, stores the data in succession at eight-byte intervals at addresses 7+N, 15+N, 23+N, ..., 2N−1 of the image buffer 13 continuously until the raster image data for line no. 15 have been stored at addresses N, 8+N, 16+N, ..., 2N−8 (Step 121, FIG. 5).

The two-byte flag is checked (Step 122) after the raster image data for line no. 15 have been completely stored. If the two-byte flag is ON, the reception of the raster image data from the host computer is suspended and the crosswise conversion process is performed (Step 123).

Figure 6:
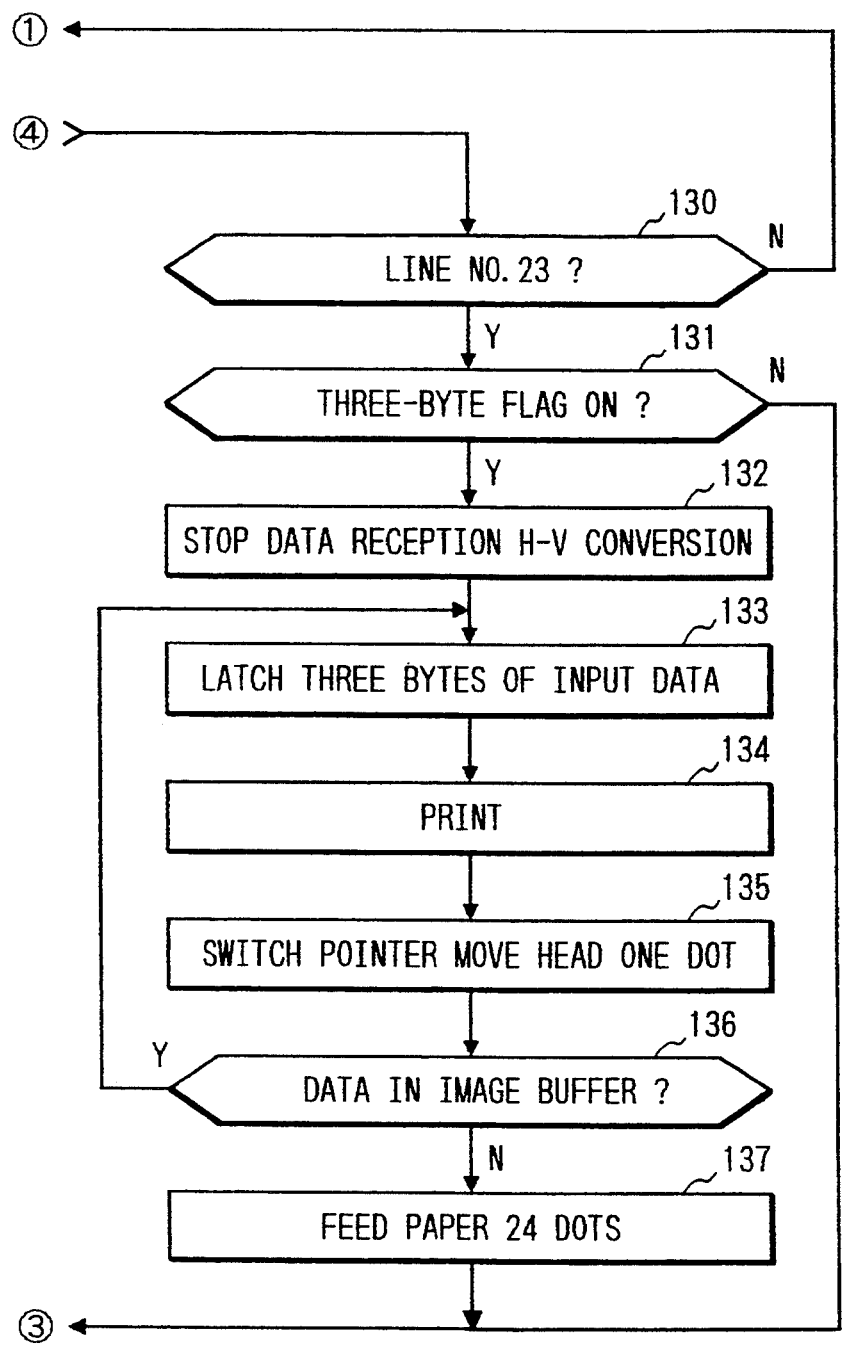
FIG. 6 is a flowchart showing the printing operation in a three-byte mode in the alcove printer.

If the two-byte flag is OFF, that is, when the three-byte flag is ON, the image assembling unit 12 receives the raster image data for line no. 16 in succussion, and with 2N as an offset value, stores the data at eight-byte intervals in the image buffer 13 at addresses 7+2N, 15+2N, 23+2N, ..., 3N until the raster image data for line no. 23 has been stored at addresses 2N, 8+2N, 16+2N, ..., 3N−8 (Step 130, FIG. 6).

Figure 11:
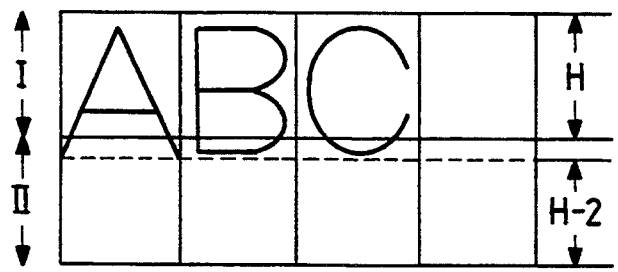
FIG. 11 is an exemplary diagram illustrating an example of print data.
Figure 12:
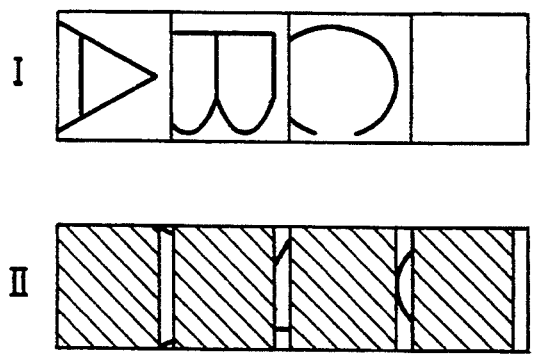
FIG. 12 is an exemplary diagram illustrating data being transferred in the first and second paths.

With respect to the images generated by the host computer as shown in FIG. 11, the image assembling unit 12 stores the raster image data in the image buffer 13 in such a state that images to be actually printed are rotated 90° clockwise, as shown in FIG. 12.

Figure 13:
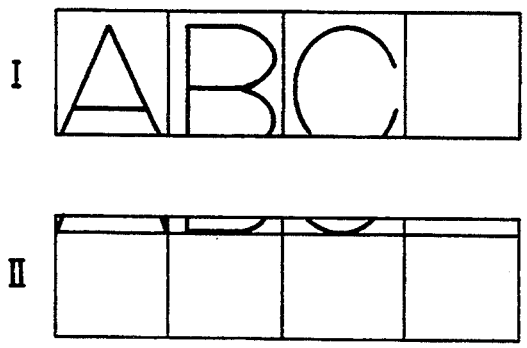
FIG. 13 is an exemplary diagram illustrating bit map data during the printing operation.

In the aforementioned crosswise conversion process, data is read continuously every eight bytes from the leading address of the image buffer 13 to generate eight-byte data rotated by 90° counterclockwise by extracting the corresponding bits so as to overwrite each datum at the address of the memory where the original data was been stored. In this way, data corresponding to the pin arrangement of the recording head 4 are stored in the image buffer 13 without the necessity of a separate storage area for data generation (FIG. 13). The crosswise conversion process can be carried out with the microcomputer.

Upon the termination of the crosswise conversion process in conformity with the byte flags as stated above, scanning of the recording head 4 is carried out by a carriage drive motor M in the main scanning direction.

Figure 4:
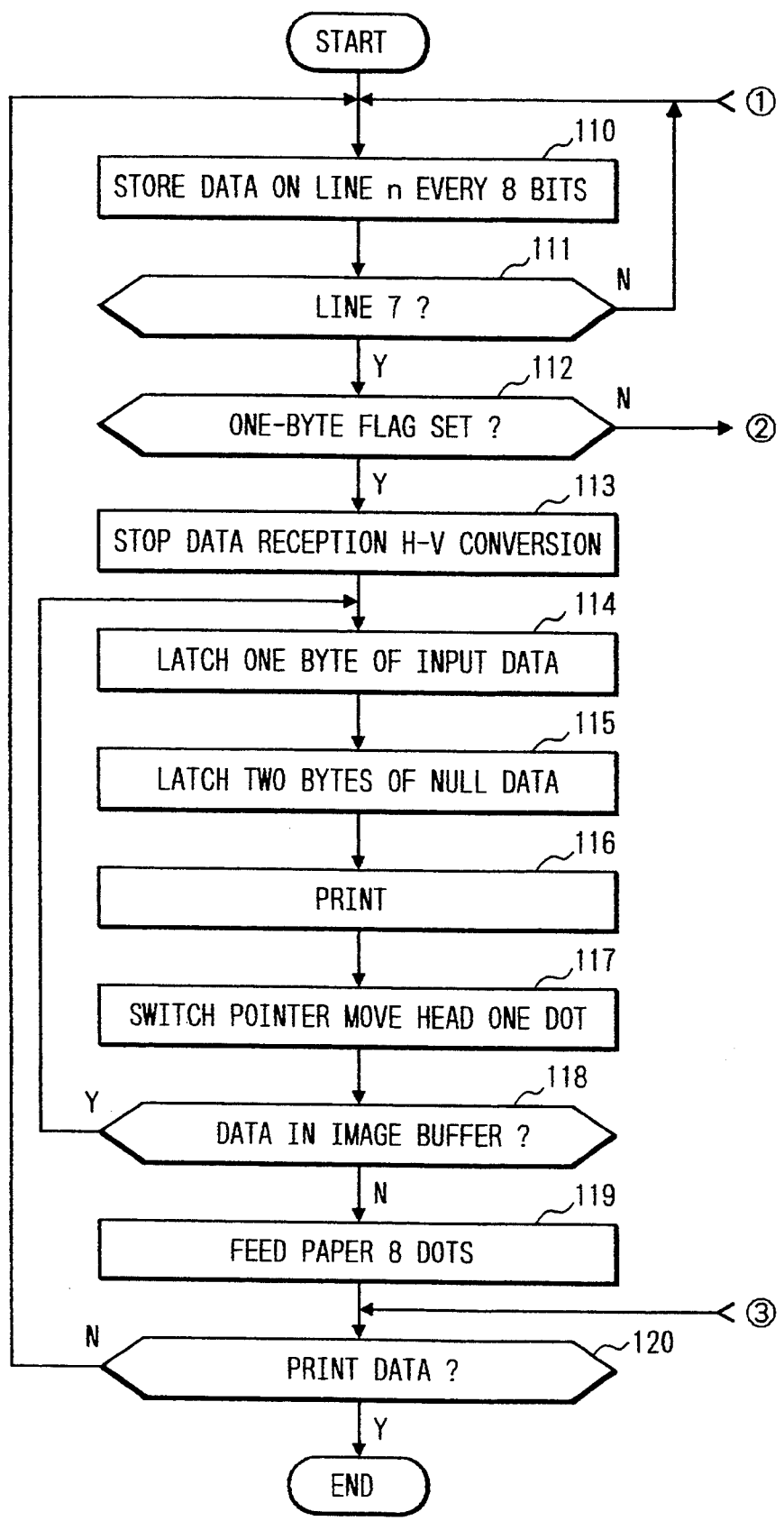
FIG. 4 is a flowchart showing the primary operation of the printer above and a printing process in a one-byte mode.
Figure 7I:
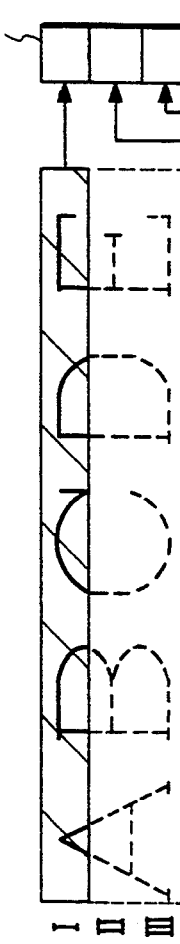
FIG. 7 is illustrative of the operations of the above printer as shown in from FIGS. 7(i)–7(iii)
Figure 7:
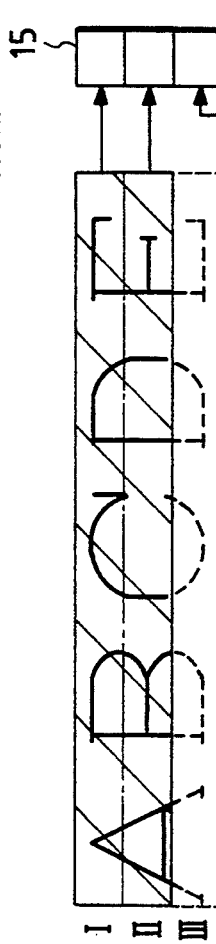

The following is an explanation of the one-byte data assembly mode with reference to FIG. 4. While the one-byte flag is ON (Step 112), one byte of image data stored in the image buffer 13 together with two bytes of null data (as deficient data) supplied from a null data generator 16, are latched by latch 15 (I, FIG. 7 (i)). When the recording head reaches a print start position (Steps 114, 115), these data are fed to a head drive circuit 3.

Consequently, the dot forming elements $P_1$-$P_8$ in the predetermined area of the recording head 4, for instance, in the first byte area (FIG. 8), print dots conforming to the print data received (Step 116). In this case, no dots will be formed by the elements $P_9$ to $P_{24}$ for forming the remaining two bytes of dots as these elements receive null data. When recording at the printing start position is terminated, a pointer for reading the image buffer 13 is switched and the recording head 4 is moved by one dot (Step 117). Then, one byte of data in the second row is read from the image buffer 13 and two bytes of null data are latched and fed to the head drive circuit 3 (Steps 114 to 118). A series of these steps is repeated thereafter, with the paper being fed through a distance corresponding to eight dots as necessary in the subscanning direction (Step 119) until all the data stored in the image buffer 13 have been printed (Step 118). The reception of raster image data from the host computer can then be restarted (Step 120).

The two-byte assembly mode will now be discussed with reference to FIG. 5. When the two-byte flag is ON (Step 122), image data corresponding to the first and second byte areas are in latch 15 (Step 124; I, II, FIG. 7 (ii)) and, with respect to the third area of the recording head 4, null data from the null data generator 16 are latched when the recording head 4 reaches the print start position (Step 125). This data is fed to the head drive circuit 3.

Consequently, the dot forming elements $P_1$–$P_{16}$ in the first and second byte area of the recording head 4 output dots in accordance with the print data while null data is fed to the third byte area of the recording head 4, whereby images of 16 bits are printed in the subscanning direction (Step 126).

When recording at the printing start position is terminated, the pointer for reading the image buffer 13 is switched (Step 127) and the recording head 4 is moved by one dot (Step 128). Then, two bytes of print data in the second row and one byte of null data are latched at the next recording position (Step 124) before the assembled data is fed to the head drive circuit 3 (Steps 114 to 118). A series of these steps is repeated thereafter, with the paper being fed through a distance corresponding to 16 dots in the subscanning direction (Step 129) when all the data stored in the image buffer 13 have been printed (Step 128). The reception of raster image data from the host computer can then be restarted (Step 110, FIG. 4).

The three-byte assembly mode will now be discussed with reference to FIG. 6. When the three-byte flag is ON (Step 131), the image data stored in the image buffer 13 are latched from the image buffer 13 in latch 15 (Step 133) and the image data corresponding to the lengthwise first, second and third byte areas are latched and fed to the head drive circuit 3 (I, II, III, FIG. 7 (iii)) when the recording head 4 reaches the printing start position. Consequently, the dot forming elements $P_1$–$P_{24}$ in the first, second and third byte areas of the recording head 4 print dots in accordance with the received print data, whereby 24 bits of image data are printed in the subscanning direction (Step 134).

When recording at the start position has terminated, the pointer for reading the image buffer 13 is switched and the recording head 4 is moved through a distance corresponding to one dot (Step 135). Then, three bytes of data from the image buffer 13 in the second row are latched (Step 133) before being fed to the head drive circuit 3.

A series of these process steps is repeated thereafter, and the paper is fed through a distance corresponding to 24 dots in the subscanning direction (Step 137) after all the data stored in the image buffer 13 have been printed (Step 136). Then, the reception of raster image data from the host computer can be restated (Step 110, FIG. 4).

In the three-byte mode, however, print data may be text data. In such a case, rather than feeding the recording paper though a distance corresponding to 24 dots as when the print data is raster image data, the paper is fed through a length corresponding to one line of the printed data.

Although a description has been given of a recording head provided with 24 dot forming elements in the subscanning direction by way of example, the invention is equally applicable to a recording any having any number of dot forming elements.

Moreover, although the above embodiment has been described with reference to a case where the paper is fed through a distance corresponding to one or two bytes (eight or 16 dots) when eight or 16 dots of the printing head are used for printing, the same effect will obviously be achieved by sequentially switching the area of the dot forming element for printing the bit map data without feeding the paper.

More specifically, the printing operation can be carried out by applying the data of the second byte to the second area of the dot forming elements and feeding null data to the first and third areas thereof without feeding the paper after one-byte printing has been completed in a case where, for example, the data of one byte are used for printing. At the time of printing the third byte, the print data are fed to the third area of the recording head, whereas null data are fed to the first and second areas thereof. A series of these process steps is repeated.

Although the size in the subscanning direction of bit data to be assembled in tire image buffer has been based on one byte as a unit in the embodiment described above, the same effect will obviously be achieved by employing data of four or 16 bits as a unit in accordance with the number of dot forming elements of the recording head and the memory structure.

Figure 9:
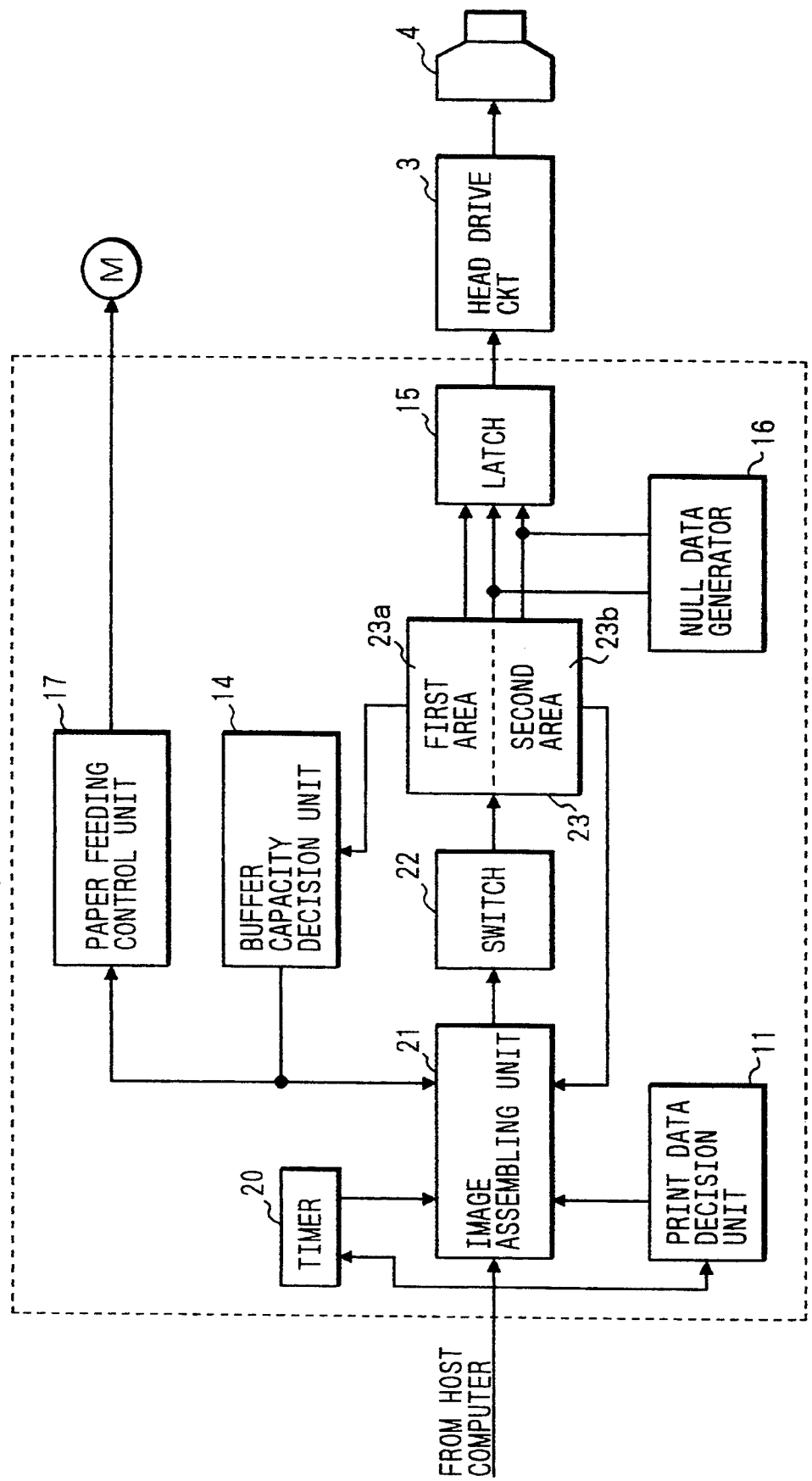
FIG. 9 is a block diagram illustrating another embodiment of the present invention.

FIG. 9 illustrates a second embodiment of the present invention, wherein reference numeral 20 denotes a timer which starts a timing operation when the feeding of raster image data is stopped and which outputs a signal when the raster image data is not fed for a predetermined time T. Reference numeral 21 indicates an image assembly unit having the function of starting the null data generator upon determining that the data in the print path has terminated when the signal from the timer is received, in addition to the function provided for the image assembling unit 12 discussed above.

In performing a printing operation at a pitch finer than the dot space of the recording head 4, for example, when a recording head having a dot pitch of 1/180 in. is used for printing at a pitch of 1/360 in. in the subscanning direction, there is provided in this embodiment a switch unit 22 for distributing data on even-numbered lines of the raster image data transferred from the host computer to a first area 23a of an image buffer 23 and those on odd-numbered lines thereof to a second area 23b. The switch unit 22 uses the first and second areas as a continuous buffer without distributing such data when raster image data at the same pitch as the dot space of the recording head 4 are printed.

Figure 10:
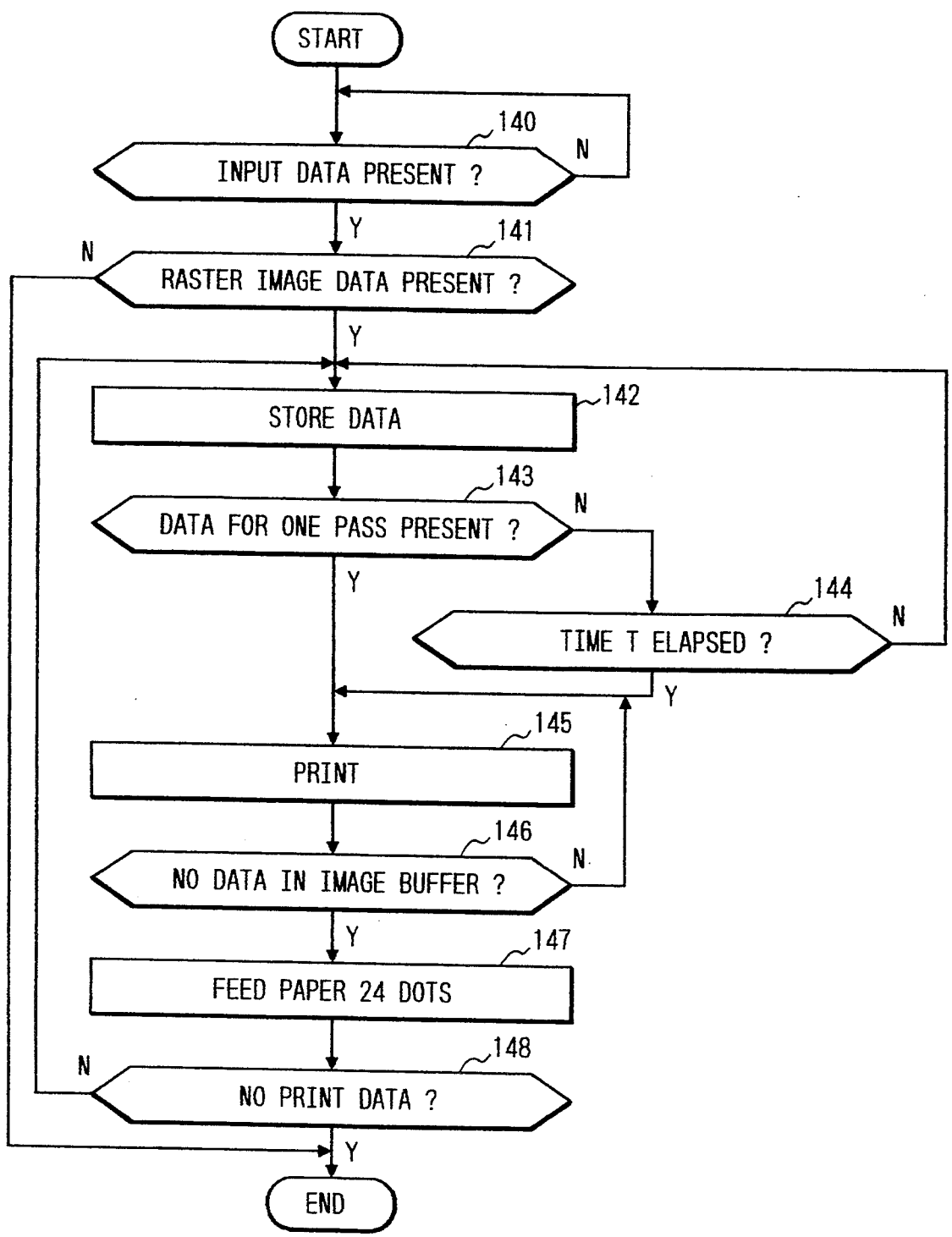
FIG. 10 is a flowchart showing the operation of the printer of FIG. 9.

Referring to the flowchart of FIG. 10, the operation of the printer thus constructed will be described.

A description will first be given of a case where, as shown in FIG. 11, a pattern of a size greater than a print span H printable by scanning a recording head in one pass and smaller than a width 2×H printable by two passes of the printing head, specifically, a pattern wider by two dots than the print span H, is printed.

When print data for the first pass (the area I in FIG. 11) is transferred from the host computer (Step 140, FIG. 10), the type of data is checked. If it is determined to be raster image data (Step 141), the data is stored in the image buffer 23 via the switch unit 22 (Step 142). A description will further be given of a case by way of example where the dot density in the subscanning direction of the raster image data transferred from the host computer conforms to the dot space of the recording head 4, that is, where the image buffer 23 operates as one continuous buffer, in order to simplify the description.

As discussed above, the raster image data from the host computer is stored in the image buffer 23 (Step 142) in such a state that they are rotated by 90° clockwise (I, FIG. 12). When the image data for one pass of the recording head is stored in the image buffer 23 (Step 143), and when the crosswise conversion process for rotating the data by 90° counterclockwise is completed, the scanning of the recording head 4 in the main scanning direction is started and the printing operation is carried out (Step 145) by feeding the data from the image buffer 23 to the dot forming elements $P_1, P_2, P_3, \ldots P_{24}$ while moving the recording head 4 dot by dot. As a result, dots in the original form in which they were received from the host computer are formed on the recording paper (I, FIG. 13).

After the termination of printing the raster image data of the first pass in this manner (Step 146), the recording paper is fed through a distance corresponding to 24 dots, and the transfer of data from the host computer for the second pass is performed.

With respect to the data of the second pass, the print data is contained in a section equivalent to two dots starting from the uppermost pin of the recording head 4, as shown in FIG. 11. Therefore, these data are stored in the image buffer 23 while the raster image data are transferred. Like the data of the first pass, those of the second pass are also rotated 90° clockwise before being stored (II, FIG. 12).

The timer 20 starts to operate when the transfer of the raster image data is suspended after the termination of the transfer of the second of two dots. When the timer 20 times out after the state of suspension has continued for the predetermined time T (Step 144), the image assembling unit 21 performs the crosswise conversion process for rotating the data of two dots stored in the image buffer 23 by 90° counterclockwise and applies a start signal to the print unit. As a result, the recording head 4 is scanned in the main scanning direction, and bit image data are fed to the dot forming elements $P_1, P_2$ to drive the upper two dots of the recording head 4, whereas null data are fed from the null data generator 16 to the other dot forming elements ($P_3$–$P_{24}$), whereby the printing operation is carried out (Step 145).

A printing operation thus can be carried out without having to wait for the assembly of the bit data in the non-dot forming areas ($P_3$–$P_{24}$) in the image buffer 23. As a result, the waiting time from the time of initial data input to the commencement of the printing operation is shortened in proportion to the data amount.

When the image buffer 13 is emptied of data after the printing of data in the second pass has been completed in this manner (Step 146), the paper is fed through a distance corresponding to 24 dots (Step 147), and the process steps described above are repeated until the transfer of data from the host computer stops (Step 148).

A description will now be give of a case where the dot density in the subscanning direction of the raster image data transmitted from the host computer is twice as great as that of the recording head 4.

The switch unit 22 divides the image buffer 23 into a first area 23a and a second area 23b, distributes data on the even-numbered lines of the raster image data transferred from the host computer to the first area 23a and data on the odd-numbered lines to the second area 23b, and stores the data in such a state that they are rotated 90° clockwise.

After termination of the transfer of the raster image data, the crosswise conversion process for rotating the data in the first and second areas 23a and 23b by 90° counterclockwise is performed, and the rotated data is applied to drive to the recording head 4. As a result, the scanning of the recording head 4 is started and the bit data stored in the first area 23a are printed. Upon the completion of the printing of the bit data in the first area 23a, the bit data stored in the second area 23b are printed by feeding the recording paper by a pitch of half a dot, that is, 1/360 in. in the subscanning direction. When the printing of the bit data in the second area 23b is terminated, the paper is fed in such a way that the uppermost pin of the recording head 4 is located lower by half a dot pitch than the lowermost dot position of the preceding print path. The process steps above are repeated thereafter, so that it is made possible to print the raster image data at a dot pitch finer than the dot pitch of the recording head 4.

Although one line of characters is printed with two passes of the recording head by dividing the image buffer into two areas in this embodiment, raster image data can obviously be printed at a still finer dot pitch by dividing the image buffer into M (M=an integer greater than 2) or more areas, feeding the paper at a dot pitch of 1/M, and carrying out the printing operation in M passes.

As described above, the raster image serial printer according to the present invention includes the print data detecting unit for determining the type of input data, the buffer capacity decision unit for determining the capacity of the buffer in which image data is assembled, the image assembling unit for assembling the image data in the buffer by determining the number of bits to be assembled in the columnar direction corresponding to the result obtained by the decision unit, and the null data generator for generating the data assembled in the buffer together with null data. As the assembly of null data can be omitted, a printing operation can still be carried out even when the capacity of the memory available for use as an image buffer is small. Moreover, the data throughput is improved since printing operations can be carried out without waiting for the completion of the assembly of the image data for all dot forming elements of the recording head.

What is claimed is:

1. A raster image serial printer, comprising:
   a print head having a plurality of print elements arrayed in a columnar direction;
   print data decision means for determining whether input data is raster image data;
   buffer capacity decision means for determining the capacity of a buffer in which image data is assembled;
   image assembling means coupled to said print data decision means for assembling image data in said buffer by determining a number of bits of said image data to be assembled in said columnar direction corresponding to said print elements based on a result obtained by said print data decision means; and
   null data generating means for generating null data corresponding to portions of said buffer not filled by said image data.

2. A raster image serial printer, comprising:
   raster command analysis means for determining a type of input data;
   raster image storing means;
   supplying means coupled to said raster image storing means for supplying raster image data to said raster image storing means;
   timer means coupled to said raster command analysis means for starting a timing operation at a point in time when feeding of said input data is stopped;

information generating means coupled to said timer means for generating null data information and print start information after the passage of a predetermined time after the start of said timing operation; and null data generating means coupled to said information generating means for outputting null data when said null data information and said print start information are output to a recording head.

3. A method for operating a raster image serial printer, comprising the steps of:
   (a) determining a type of received input data and an available capacity of a print image buffer;
   (b) storing in a first portion of a print element buffer an amount of said input data in a columnar direction for each of a plurality of lines to be printed, said lines each corresponding to a print element of a print head, said amount of said input data being determined based on said type of received input data and said available capacity of said print image buffer;
   (c) storing null data in other portions of said print element buffer;
   (d) driving a recording head as said recording head is scanned along a recording medium in accordance with data stored in said print element buffer to print dots on said recording medium in accordance with said data stored in said print image buffer; and
   (e) repeating steps (b) to (d) for remaining portions of said input data in said columnar direction.

4. The method for operating a raster image serial printer of claim 3, further comprising the step of setting a byte flag in accordance with the type of said received input data and said available capacity of said print image buffer indicative of a number of bytes of said input data in said columnar direction to be stored in said print image buffer, said amount of said input data in said columnar direction stored in said print image buffer being determined in accordance with said byte flag.

5. The method for operating a raster image serial printer of claim 3, further comprising the steps of moving said paper after each repetition of step (d) through a distance corresponding to said amount of said input data in said columnar direction stored in said print image buffer.

6. The method for operating a raster image serial printer of claim 3, further comprising the step of, after each repetition of step (d), said elements of said recording head employed to print dots on said recording medium in accordance with said data stored in said print image buffer.

7. The method for operating a raster image serial printer of claim 3, further comprising the steps of:
   distributing said input data stored in said print image buffer into a plurality of areas of said print image buffer corresponding to respective lines of said raster image data; and
   moving said paper after each repetition of step (d) through a distance corresponding to a pitch of 1/M dot size, where M is the number of said areas.

8. The method for operating a raster image serial printer of claim 3, further comprising the step of crosswise rotating the data stored in said print image buffer prior to step (d).

* * * * *